(12) United States Patent
Gold et al.

(10) Patent No.: US 8,556,143 B2
(45) Date of Patent: Oct. 15, 2013

(54) MOUNTING APPARATUS

(75) Inventors: Adam Gold, Scarsdale, NY (US); Wayne Chen, Los Angeles, CA (US)

(73) Assignee: Adaptiv Technologies LLC, Santa Monica, CA (US)

( * ) Notice: Subject to any disclaimer, the term of this patent is extended or adjusted under 35 U.S.C. 154(b) by 313 days.

(21) Appl. No.: 12/931,797

(22) Filed: Feb. 8, 2011

(65) Prior Publication Data

US 2012/0199620 A1 Aug. 9, 2012

(51) Int. Cl.
*B62J 7/00* (2006.01)

(52) U.S. Cl.
USPC ............................. 224/413; 224/929; 248/636

(58) Field of Classification Search
USPC ................................... 248/636; 224/413, 929
See application file for complete search history.

(56) References Cited

U.S. PATENT DOCUMENTS

| 3,895,408 | A | * | 7/1975 | Leingang | 16/2.1 |
| 5,109,411 | A | * | 4/1992 | O'Connell | 379/454 |
| 2009/0195434 | A1 | * | 8/2009 | Chen et al. | 342/20 |

* cited by examiner

*Primary Examiner* — Nathan J Newhouse
*Assistant Examiner* — Scott McNurlen
(74) *Attorney, Agent, or Firm* — Raymond Sun

(57) ABSTRACT

A mounting assembly for interconnecting a first object and a second object has a link assembly having a first end that couples the first object, and a second end that couples the second object, and a top plate assembly pivotably coupled to the second end of the link assembly. The top plate assembly includes an upper plate having a plurality of holes for attachment to a receiving device, and a lower plate pivotably coupled to the second end of the link assembly. The lower plate is connected to the upper plate only through a plurality of shock and vibration absorption members, thereby improving the shock and vibration absorption effect.

17 Claims, 3 Drawing Sheets

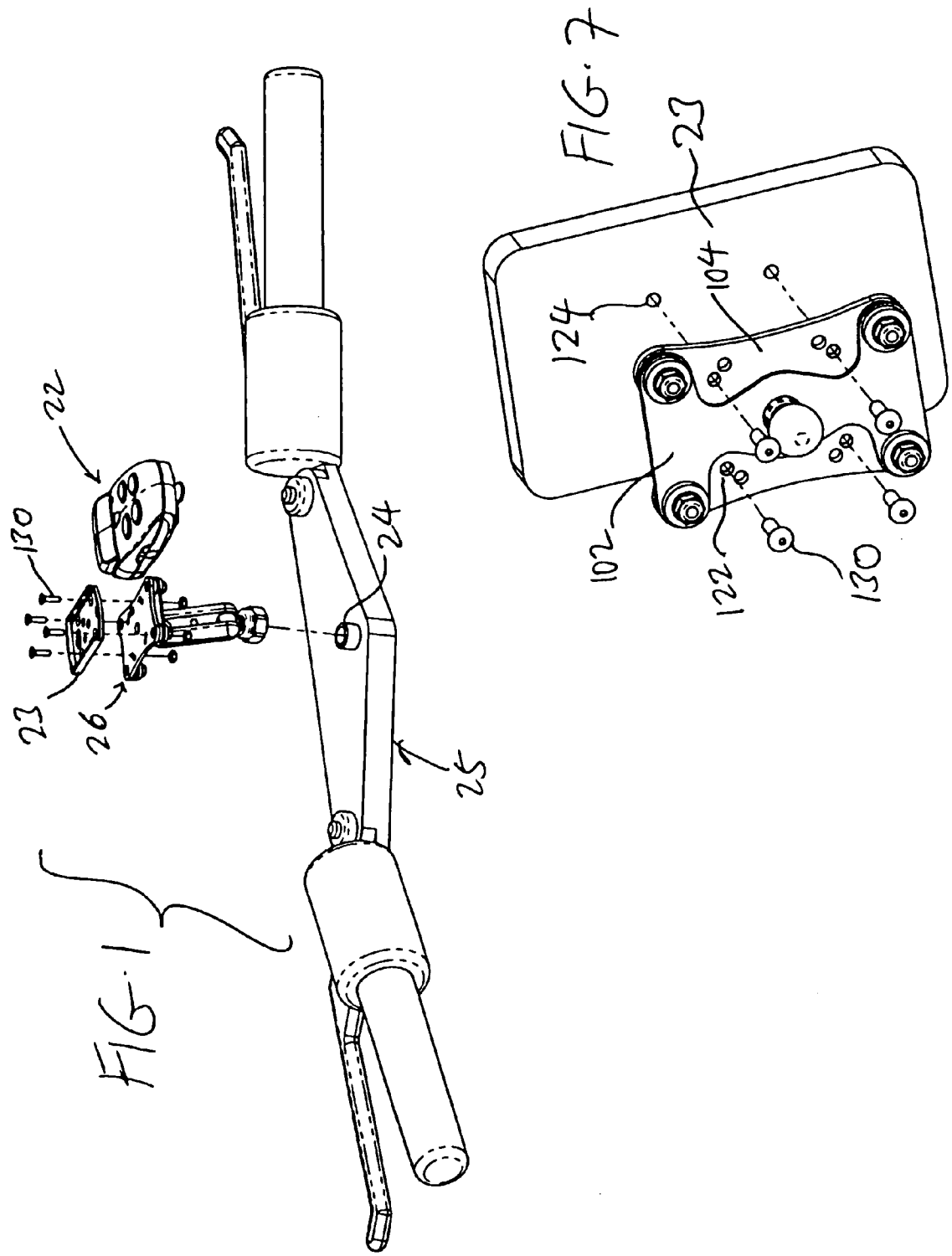

MOUNTING APPARATUS

BACKGROUND OF THE INVENTION

1. Field of the Invention

The present invention relates to a flexible mounting apparatus, and in particular, to an improved universal ball-and-socket mounting apparatus that can be used to mount electronic devices to motorcycles.

2. Description of the Prior Art

Motorcycle riders are increasingly mounting electronic devices to their motorcycles. These devices can include GPS units, cell phones, music players, radios, radar detectors, and other items. These electronic devices are often not designed to withstand the substantial shock and vibrations produced by a motorcycle. Therefore, it is advantageous to have a mount that will reduce the shock and vibrations experienced by the electronic device.

Many electronic devices are also beginning to standardize the mounting hole locations. A common standardization is the AMPS hole pattern. The AMPS hole pattern consists of 4 holes in a rectangular pattern spaced 1.50"×1.19" apart. Some devices do not have this pattern, but can be mounted on a flat plate using double sided tape or hook and loop fastener. To accommodate both of these mounting methods, it is advantageous to have a mount that has a flat top plate with an AMPS hole pattern.

SUMMARY OF THE INVENTION

In order to accomplish the above-described and other objects of the present invention, the present invention provides a mounting assembly for interconnecting a first object and a second object. The mounting assembly has a link assembly having a first end that couples the first object, and a second end that couples the second object, and a top plate assembly pivotably coupled to the second end of the link assembly. The top plate assembly includes an upper plate having a plurality of holes for attachment to a receiving device, and a lower plate pivotably coupled to the second end of the link assembly. The lower plate is connected to the upper plate only through a plurality of shock and vibration absorption members, thereby improving the shock and vibration absorption effect.

BRIEF DESCRIPTION OF THE DRAWINGS

FIG. 1 is a perspective view of a mounting apparatus according to one embodiment of the present invention shown in use holding a radar detector on a handlebar of a motorcycle.

FIG. 7 illustrates how the cradle is connected to the top plate assembly of FIG. 4.

DETAILED DESCRIPTION OF THE PREFERRED EMBODIMENTS

Figure 3:
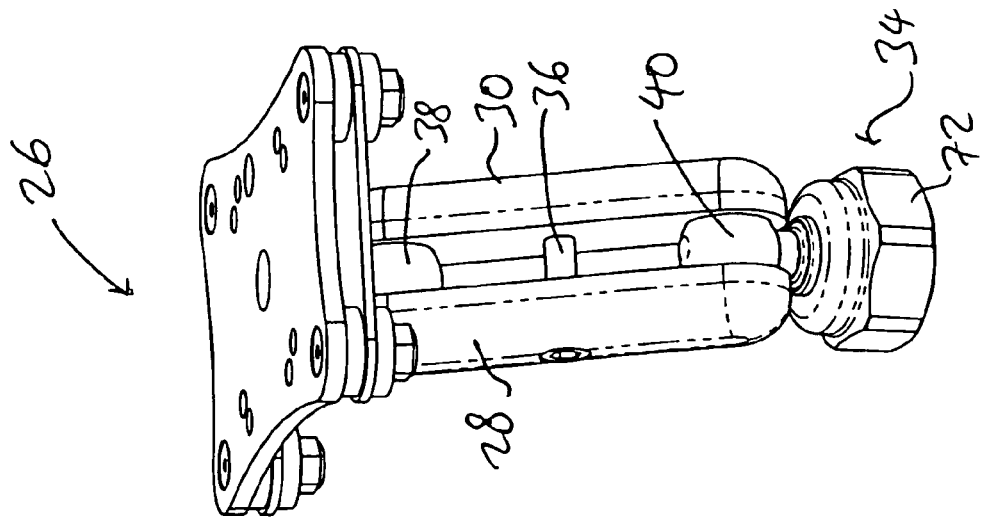
FIG. 3 is a perspective view of the mounting apparatus of FIG. 1 shown in an assembled state.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

FIGS. 1-7 illustrate a mounting apparatus 20 according to the present invention. In FIG. 1, the mounting apparatus 20 is shown supporting a conventional radar detector 22 on the yoke stem 24 of a handlebar 25 of a conventional motorcycle. As such, the handlebar 25 functions as a supporting base. In this embodiment, the yoke stem 24 (and the handlebar 25) is the stationary object and the radar detector 22 is the movable object. The radar detector 22 is removably secured to a receiving device (e.g., cradle 23) that is connected to a top plate assembly 26 via screws 130. The top plate assembly 26 is pivotably (e.g., including rotatably) connected to the top end of the mounting apparatus 20.

Figure 2:
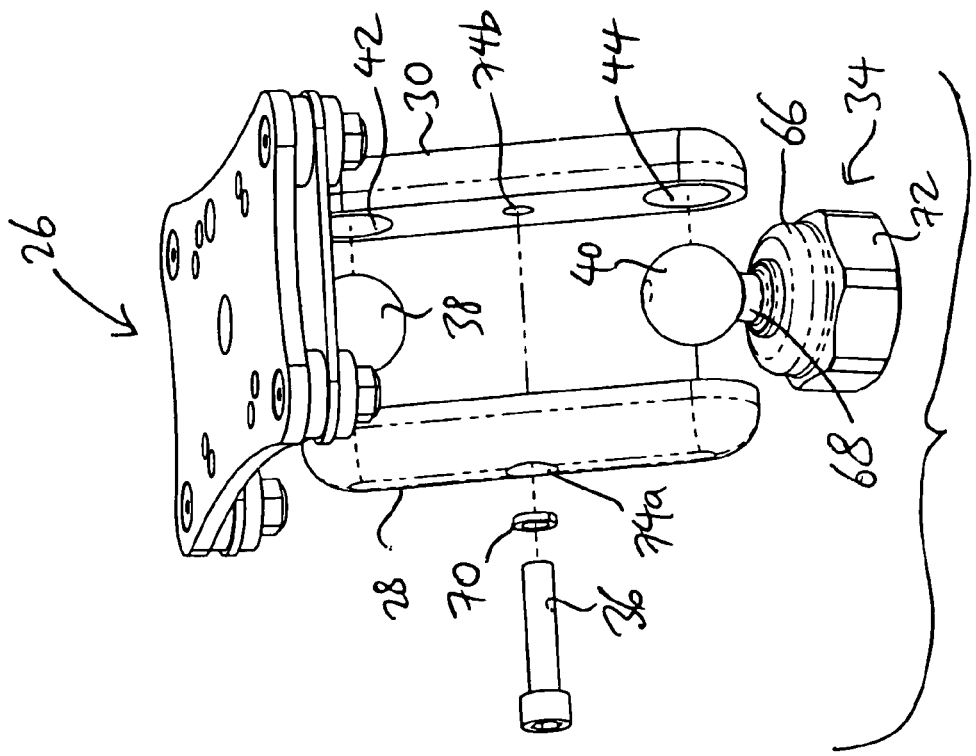
FIG. 2 is an exploded perspective view of the mounting apparatus of FIG. 1.
Figure 4:
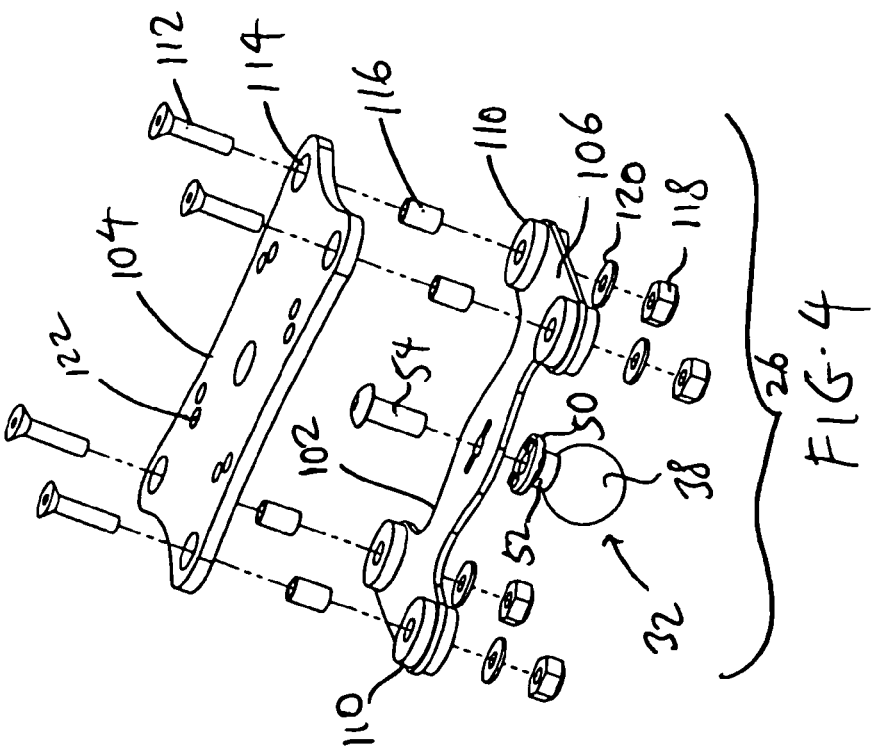
FIG. 4 is an exploded perspective view of a top plate assembly for the mounting apparatus of FIG. 1.

Referring to FIGS. 2 and 4, the mounting apparatus 20 comprises a split-arm assembly that has two separate and rigid link sections 28 and 30, an upper coupler 32, a lower coupler 34, and a link screw 36. The link sections 28 and 30 are essentially identical except that their holes 74a, 74b are slightly different. The link section 28 has a countersink and clearance hole 74a, while the other link section 30 has a tapped hole 74b. The upper coupler 32 has a spherical upper ball 38 and the lower coupler 34 has a spherical lower ball 40. Each link section 28, 30 has an upper socket section 42 and a lower socket section 44 positioned adjacent the upper and lower ends, respectively. The link sections 28, 30 are clamped together with the upper ball 38 retained inside the space defined by the upper socket sections 42, and with the lower ball 40 retained inside the space defined by the lower socket sections 44. The link screw 36 functions to clamp the link sections 28, 30 together with the help of a washer 70, by extending through holes 74a and 74b provided at about the center of each link section 28 and 30, respectively.

The upper coupler 32 has a disc-shaped base 50 with a reduced-diameter neck 52 connecting the upper ball 38 and the base 50. The top plate assembly 26 is connected to the base 50 by a screw 54. The top plate assembly 26 will be described in greater detail below.

The lower coupler 34 has a disc-shaped base 66 with a reduced-diameter neck 68 connecting the upper ball 40 and the base 66. A yoke nut 72 is secured to the base 66, with the yoke nut 72 adapted to be threadably connected to the yoke stem 24 using known techniques.

The balls 38, 40, the link sections 28, 30 and the bases 50 and 66 are preferably made of the same material, and the material can be a metal, or a plastic. These elements can be made of the same or different materials, but they should all have the same material hardness so that one component does not deform or damage the other.

Figure 5:
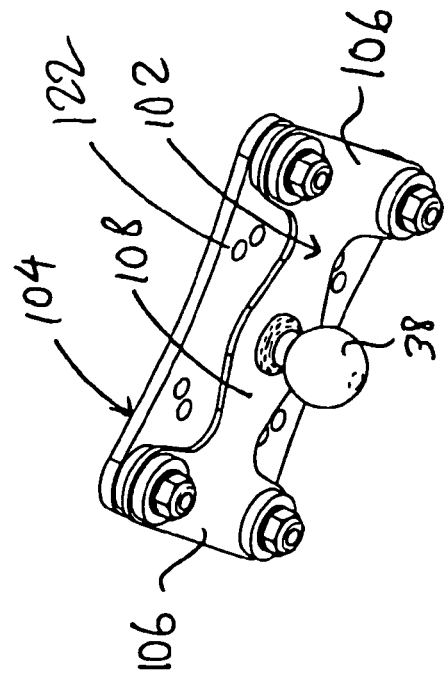
FIG. 5 is a bottom perspective view of the top plate assembly of FIG. 4.

Referring now to FIGS. 4-7, the top plate assembly 26 includes an upper plate 104 and a lower plate 102. The upper plate 104 has a generally rectangular configuration with curved edges, while the lower plate 102 is generally shaped like the letter "I", with two end bars 106 connected by an elongated central bar 108. The bars 106, 108 can all have curved edges. As best seen in FIGS. 5 and 7, the lower plate 102 has a smaller surface area than the upper plate 104, thereby allowing portions of the underside (lower surface) of the upper plate 104 at the locations of the AMPS holes 122 to be exposed (i.e., not covered by the lower plate 102).

Figure 6:
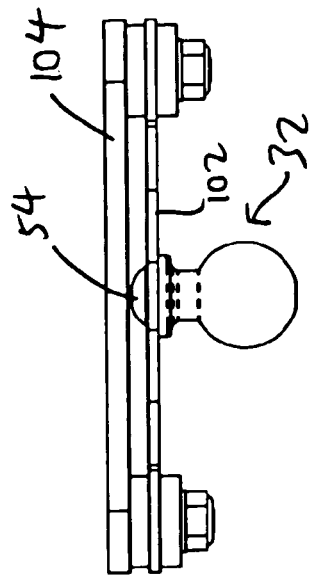
FIG. 6 is a side plan view of the top plate assembly of FIG. 4.

The lower plate 102 is rigidly connected to the base 50 of the upper coupler 32 by the screw 54 whose head is seated between the upper plate 104 and the lower plate 102 (see FIG. 6). The lower plate 102 has four holes at the corners, with a vibration absorbing grommet 110 placed into each of these holes. The upper plate 104 is then connected to lower plate 102 by inserting screws 112 through each of the corner holes 114 in the upper plate 104, with each screw 112 passing through a corresponding vibration spacer 116 and then through the bore of the corresponding grommet 110. Each screw 112 is secured by a locknut 118 and washer 120 combination. As best shown in FIG. 6, the upper plate 104 only connects to the lower plate 102 through the grommet 110, thereby producing a vibration and shock absorbing effect. Therefore, the grommets 110 function as vibration and shock absorbing members. In this regard, the grommets 110 are preferably made from a thermoplastic or thermoset rubber such as PVC, Neoprene, or Urethane, with a hardness durometer of 20-60 Shore A.

The upper plate 104 has two AMPS hole patterns (i.e., eight holes 122) to allow a device cradle (e.g., for a radar detector) to be mounted thereto. Referring to FIGS. 1 and 7, in the present embodiment, for example, the cradle 23 can have four holes 124 arranged in an AMPS hole pattern so that the cradle 23 can be mounted to the upper plate 104 using four screws 130 that extend through the four holes 124 in the cradle 23, and four of the holes 122 in the upper plate 104. Thus, the reduced surface area of the lower plate 102 allows the screws 130 to extend through the upper plate 104 without passing through the lower plate 102, thereby improving shock and vibration absorption. As best shown in FIG. 1, the cradle 23 can have two opposing side bars that are connected by a rear bar, with the front edge of the cradle 23 is opened, so that the side bars can act as rails for allowing the radar detector 22 to be slid on to the cradle 23 via corresponding rails on the bottom or side of the radar detector 22.

The top plate assembly 26 provides numerous benefits. It has a flat upper plate 104, which allows it to have a low profile. It facilitates universal use by providing the standard AMPS hole patterns. The low profile and standard hole patterns allow for a wide variety of different devices 22 and cradles 23 to be attached to the upper plate 104. It is also convenient to use because the configuration of the lower plate 102 allows access for the screws 130 to connect the upper plate 104 to the cradle 23 without coupling the lower plate 102. The top plate assembly 26 provides excellent shock and vibration absorption because only the grommets 110 connect the upper plate 104 and the lower plate 102. Finally, the flat upper plate 104 allows for the use of double-sided adhesive tape or Velcro™, which can be useful for devices such as radar detectors that do not have cradles.

Even though the mounting apparatus 20 is shown and described in connection with the yoke nut 72 and top plate assembly 26 for use in an automotive (or motorcycle) environment to support a radar detector 22, these are merely non-limiting examples. The mounting apparatus 20 and top plate assembly 26 of the present invention can be applied to other applications and used with other connecting mechanisms. Examples include LCD monitors and GPS units, among others.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A mounting assembly for interconnecting a first object and a second object, comprising:
a link assembly having a first end that couples the first object, and a second end that couples the second object;
a top plate assembly pivotably coupled to the second end of the link assembly, the top plate assembly comprising:
a generally rectangular upper plate having two generally parallel first edges and two generally parallel second edges, the upper plate having a first, second, third and fourth corner holes, each positioned adjacent a corner defined by two of the edges, the upper plate having a plurality of device connecting holes for use in attaching the upper plate to an electronic device or a receiving device, the upper plate having a lower surface; and
a lower plate pivotably coupled to the second end of the link assembly, the lower plate configured with two end bars and a connecting bar between the end bars, with each end bar aligned with one of the second edges of the upper plate when the lower plate is attached to the lower surface of the upper plate, thereby defining an exposed inside area of the lower surface of the upper plate between the first edges of the upper plate and outer edges of the connecting bar of the lower plate between the two end bars;
wherein the lower plate is connected to the upper plate only through a plurality of shock and vibration absorption members that are positioned at the locations of the corner holes; and
wherein the plurality of device connecting holes are positioned on the upper plate in locations inside the exposed inside area of the lower plate.

2. The assembly of claim 1, wherein the shock and vibration absorption members are rubber grommets.

3. The assembly of claim 2, wherein the lower plate has a plurality of connection holes that are aligned with the corner holes of the upper plate, with each grommet secured inside one of the connection holes in the lower plate, wherein a screw extends through each aligned corner hole from the upper plate and a corresponding grommet in the lower plate to connect the upper plate to the lower plate.

4. The assembly of claim 1, further including a receiving device or an electronic device that is attached via screws to the device connecting holes in the upper plate.

5. The assembly of claim 1, wherein the upper plate is a flat plate.

6. The assembly of claim 1, wherein the link assembly comprises:
first and second rigid link sections, each link section having an upper socket section and a lower socket section, so that an upper receiving space is defined by the two upper socket sections and a lower receiving space is defined by the two lower socket sections;
an upper coupler having an upper ball that is received for rotation inside the upper receiving space, with the lower plate secured to the upper coupler;
a lower coupler having a lower ball that is received for rotation inside the lower receiving space, with the stationary object secured to the lower coupler; and
a link member for securing the link sections together with the upper ball retained inside the upper receiving space, and with the lower ball retained inside the lower receiving space.

7. The assembly of claim 1, further including a receiving device or an electronic device that is attached via double-sided tape or VELCRO™ pads to the upper plate.

8. The assembly of claim 1, wherein the first object is a stationary object and the second object is a movable object.

9. An assembly, comprising:
an electronic device;
a receiving device for receiving the electronic device;
a motorcycle; and a mounting assembly for interconnecting a portion of the motorcycle and the receiving device, comprising:
   a link assembly having a first end that couples the motorcycle, and a second end;
   a top plate assembly pivotably coupled to the second end of the link assembly, the top plate assembly comprising:
      a generally rectangular upper plate having two generally parallel first edges and two generally parallel second edges, the upper plate having a first, second, third and fourth corner holes, each positioned adjacent a corner defined by two of the edges, the upper plate having a plurality of device connecting holes for use in attaching the upper plate to the receiving device, the upper plate having a lower surface; and
      a lower plate pivotably coupled to the second end of the link assembly, the lower plate configured with two end bars and a connecting bar between the end bars, with each end bar aligned with one of the second edges of the upper plate when the lower plate is attached to the lower surface of the upper plate, thereby defining an exposed inside area of the lower surface of the upper plate between the first edges of the upper plate and outer edges of the connecting bar of the lower plate between the two end bars;
      wherein the lower plate is connected to the upper plate only through a plurality of shock and vibration absorption members that are positioned at the locations of the corner holes; and
      wherein the plurality of device connecting holes are positioned on the upper plate in locations inside the exposed inside area of the lower plate.

10. The assembly of claim 9, wherein the shock and vibration absorption members are rubber grommets.

11. The assembly of claim 10, wherein the lower plate has a plurality of connection holes that are aligned with the corner holes of the upper plate, with each grommet secured inside one of the connection holes in the lower plate, wherein a screw extends through each aligned corner hole from the upper plate and a corresponding grommet in the lower plate to connect the upper plate to the lower plate.

12. The assembly of claim 9, wherein the receiving device is attached via screws to the device connecting holes in the upper plate.

13. The assembly of claim 9, wherein the upper plate is a flat plate.

14. The assembly of claim 9, wherein the link assembly comprises:
   first and second rigid link sections, each link section having an upper socket section and a lower socket section, so that an upper receiving space is defined by the two upper socket sections and a lower receiving space is defined by the two lower socket sections;
   an upper coupler having an upper ball that is received for rotation inside the upper receiving space, with the lower plate secured to the upper coupler;
   a lower coupler having a lower ball that is received for rotation inside the lower receiving space, with the stationary object secured to the lower coupler; and
   a link member for securing the link sections together with the upper ball retained inside the upper receiving space, and with the lower ball retained inside the lower receiving space.

15. A top plate assembly for use in securing a receiving device thereon, comprising:
   a flat generally rectangular upper plate having two generally parallel first edges and two generally parallel second edges, the upper plate having a first, second, third and fourth corner holes, each positioned adjacent a corner defined by two of the edges, the upper plate having a plurality of device connecting holes for use in attaching the upper plate to an electronic device or a receiving device, the upper plate having a lower surface; and
   a lower plate configured with two end bars and a connecting bar between the end bars, with each end bar aligned with one of the second edges of the upper plate when the lower plate is attached to the lower surface of the upper plate, thereby defining an exposed inside area of the lower surface of the upper plate between the first edges of the upper plate and outer edges of the connecting bar of the lower plate between the two end bars;
   wherein the lower plate is connected to the upper plate only through a plurality of shock and vibration absorption members that are positioned at the locations of the corner holes; and
   wherein the plurality of device connecting holes are positioned on the upper plate in locations inside the exposed inside area of the lower plate.

16. The assembly of claim 15, wherein the shock and vibration absorption members are rubber grommets.

17. The assembly of claim 16, wherein the lower plate has a plurality of connection holes that are aligned with the corner holes of the upper plate, with each grommet secured inside one of the connection holes in the lower plate, wherein a screw extends through each aligned corner hole from the upper plate and a corresponding grommet in the lower plate to connect the upper plate to the lower plate.

\* \* \* \* \*